United States Patent [19]

Smith

[11] 4,117,628
[45] Oct. 3, 1978

[54] CULTURE AND GROWTH SYSTEM FOR EPIPHYTIC PLANTS

[76] Inventor: Robert C. Smith, Rte. #6, Pembroke Hwy., Statesboro, Ga. 30458

[21] Appl. No.: 806,494

[22] Filed: Jun. 14, 1977

[51] Int. Cl.² ............................................. A01G 9/02
[52] U.S. Cl. ............................................. 47/59; 47/47; 47/63; 47/70; 47/DIG. 7
[58] Field of Search ........... 47/66, 47, 67, 70, 58, 47/59, 63, DIG. 7

[56] References Cited

U.S. PATENT DOCUMENTS

| 620,150 | 2/1899 | Kitchen | 47/66 |
|---|---|---|---|
| 754,248 | 3/1904 | Simpson | 47/70 |
| 2,406,439 | 8/1946 | Pratt | 47/47 X |
| 2,893,169 | 7/1959 | Shepherd | 47/47 |
| 3,165,863 | 1/1965 | Duran | 47/70 X |
| 3,740,024 | 6/1973 | Hellerich et al. | 47/47 X |
| 3,927,491 | 12/1975 | Farnsworth | 47/62 |
| 3,988,858 | 11/1976 | Bomba | 47/58 |
| 4,040,208 | 8/1977 | England | 47/70 X |

FOREIGN PATENT DOCUMENTS

| 192,667 | 12/1956 | Austria | 47/47 |
| 255,193 | 10/1966 | Austria | 47/47 |

Primary Examiner—Edgar S. Burr
Assistant Examiner—James R. Feyrer
Attorney, Agent, or Firm—Clarence A. O'Brien; Harvey B. Jacobson

[57] ABSTRACT

Cultural support for epiphytic plants is provided by a polystyrene support body wedgingly positioned within a conical container spaced below its upper rim. The upper exposed surface of the support body has a convex curvature to promote drainage through openings in the peripheral edge abutting the container wall surface. Plant roots are anchored to the upper support surface of the support body and/or a post projecting upwardly therefrom.

12 Claims, 14 Drawing Figures

Fig. 1
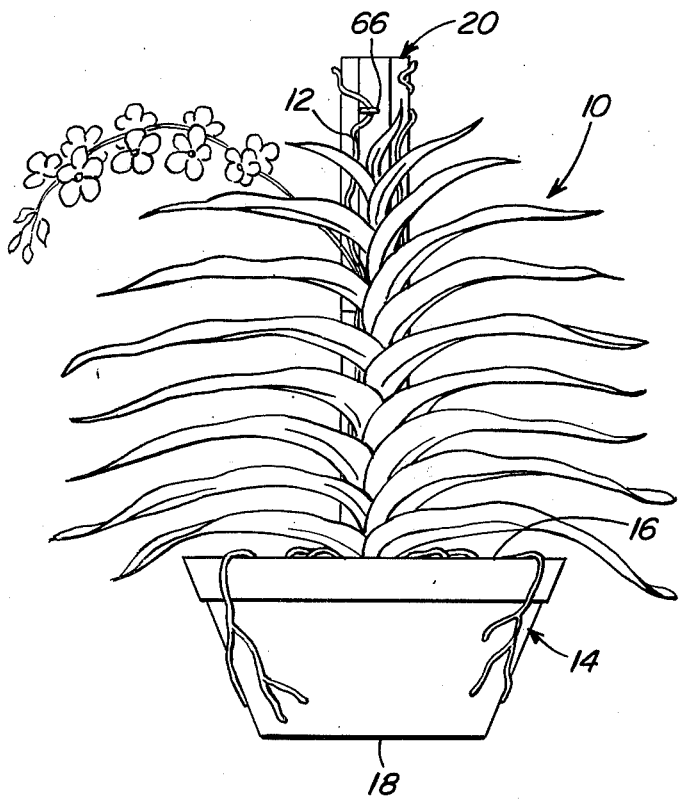
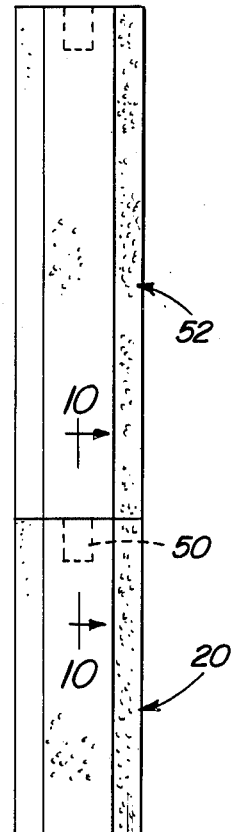
Fig. 10
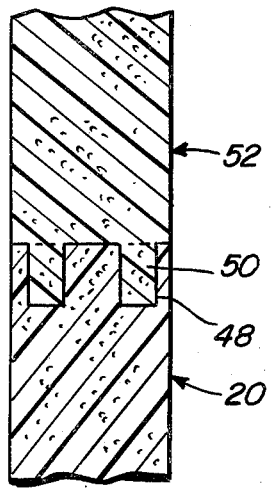
Fig. 9
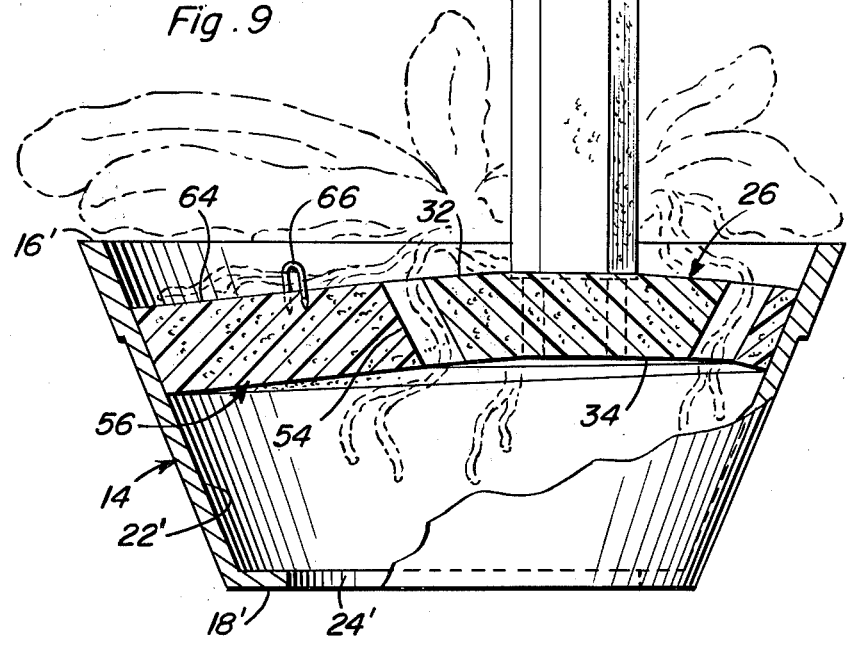

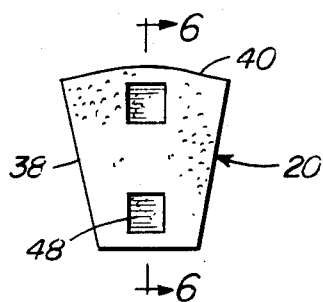
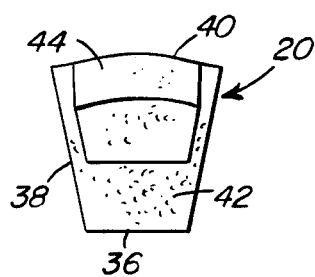
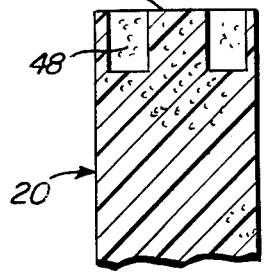
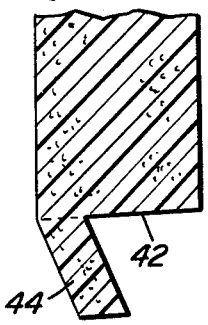
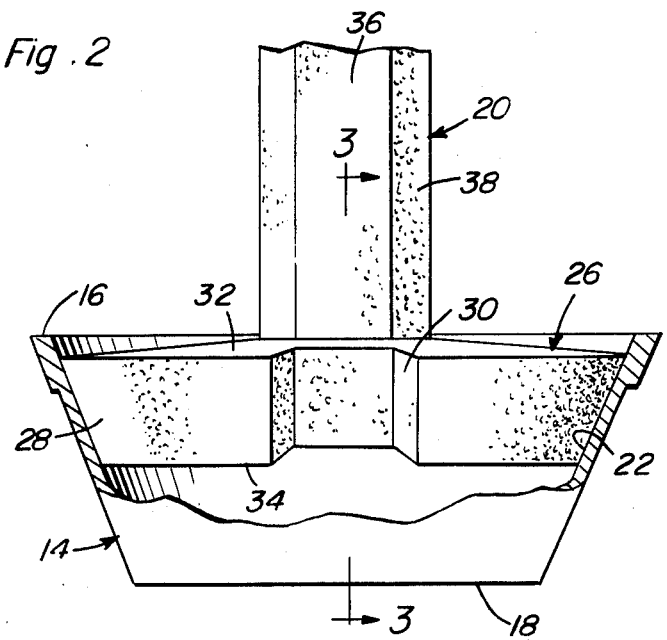
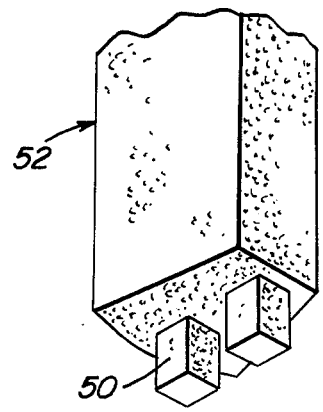
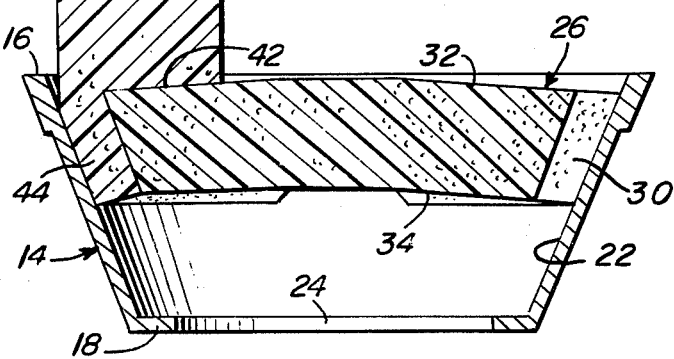

CULTURE AND GROWTH SYSTEM FOR EPIPHYTIC PLANTS

BACKGROUND OF THE INVENTION

This invention relates to a method and apparatus for promoting the growth of epiphytic plants in captivity.

Epiphytic plants include certain species of orchids capable of being grown in captivity. Such plants are characterized by roots that adhere to the surface of trees in their natural habitat completely exposed to the elements in tropical regions of the earth. Thus, in the natural habitat, the roots of epiphytic plants are exposed to high temperatures and short periods of daily rainfall, as well as constantly moving air currents or breezes. It will, therefore, be apparent that survival of epiphytic plants in captivity requires that the roots be exposed and supported on solid non-absorbent surfaces exposed to cyclical periods of saturation and drying by air currents.

Cultivation of epiphytic plants in captivity according to present methods involve support of the plant roots in pots filled with porous organic media, such as tree bark chips. Such potting media deprives the roots of light and freely moving air, resulting in resort to conflicting, contradictory and expensive procedures by growers to achieve any degree of success. For example, the confinement of roots to a wet, stagnant environment promotes root rot so that growers in an effort to minimize this danger often allow the potting medium to approach dryness before adding more water. Further, a proper balance between moisture and drying varies with different plant sizes and seasonal changes in heat and humidity. Another problem associated with the cultivation of epiphytic plants, as it is with many other types of plants, is in plant injury that occurs during repotting made necessary to enlarge the plant container as a result of plant growth.

Various devices adapted to be mounted in containers as cultural supports for plants are well known in the art, as disclosed, for example, in U.S. Pat. Nos. 2,993,300, 3,131,510, 3,823,508, 3,686,787, and 3,898,766. None of the cultural supporting arrangements disclosed in the foregoing patents are, however, expressly concerned with cultivtion of epiphytic plants in captivity and do not, therefore, deal with the problems peculiar to successful growth of epiphytic plants.

As will be apparent from the foregoing discussion, cultural growth practices normally followed by professional growers are not applicable to and are usually detrimental to the growth of epiphytic plants, as in the case of the arrangements disclosed in the aforementioned U.S. patents. It is, therefore, an important object of the present invention to provide facilities that are more suitable for the growth of epiphytic plants in captivity and which take into account the basic natural growth requirements associated with epiphytic plants, including support of the roots on solid, water impermeable surfaces for exposure to the drying effects of air currents.

An additional object of the present invention is to provide a cultural growth support for epiphytic plants in captivity through which plant injury is minimized during repotting.

Another object related to the previously stated objects is to provide a support medium for epiphytic plants which will facilitate their transfer to larger containers made necessary in in order to accommodate plant growth.

SUMMARY OF THE INVENTION

In accordance with the present invention, a cultural growth support body is provided for use with a conical container having an open bottom through which air circulation and drainage of water may be conducted. The supporting body is made of a water impermeable and decay resistant material such as a closed cell polystyrene which will not collect or hold toxic salts. The support body is shaped so that it may be wedged into place within the conical container adjacent its upper rim by abutment of its peripheral edge with the interior wall surface of the container. Openings formed at spaced locations in the peripheral edge of the support body accommodate air circulation for root drying purposes. The upper exposed surface of the support body has a convex curvature so as to promote drainge of water applied to the plants during periodic watering intervals. By anchoring the plant roots to the upper surface for support thereon, they may receive the proper quantity of moisture during by exposure to ambient air the watering periods to promote vigorous growth and yet be dried by air currents in order to avoid root rot. Vertical posts may be interfitted with the support body through one of its peripheral openings in order to provide extended growth support surfaces for the roots of plants grown in a monopodial pattern as distinguished from the sympodial growth pattern, wherein the roots are supported only on the upper surface of the supporting body.

In order to transfer a plant, potted in accordance with the present invention, to a larger container with minimal disturbance, the basic support body may be wedgingly inserted into an adaptor wherein it forms an inner core of an enlarged support body. The adaptor in such case is formed with the peripheral edge wedgingly positioned within a larger container. Where a vertical post is utilized, its vertical height may be increased by the use of post extensions.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

FIG. 1 is a front elevational view of an epiphytic plant culturally supported in captivity in accordance with the present invention.

FIG. 2 is an enlarged partial front elevational view with parts broken away and shown in section of the cultural support arrangement illustrated in FIG. 1.

FIG. 3 is a partial sectional view taken substantially through a plane indicated by section line 3—3 in FIG. 2.

FIG. 4 is a top plan view of the disassembled vertical support post associated with the arranged shown in FIGS. 1 and 2.

FIG. 5 is a bottom plan view of the disassembled post shown in FIG. 4.

FIG. 6 is a partial longitudinal sectional view taken substantially through a plane indicated by section line 6—6 in FIG. 4.

FIG. 8 is an enlarged perspective view of a portion of an extension post.

FIG. 9 is a front elevational view with parts broken away and shown in section of an enlarged cultural support arrangement.

FIG. 10 is an enlarged partial sectional view taken substantially through a plane indicated by section line 10—10 in FIG. 9.

DETAILED DESCRIPTION OF THE PREFERRED EMBODIMENTS

Figure 11:
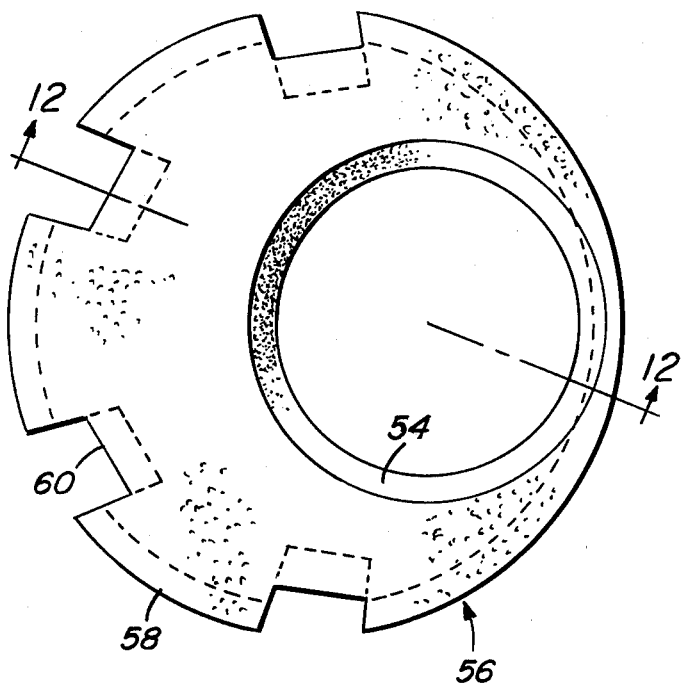
FIG. 11 is a top plan view of the adaptor component utilized in the arrangement illustrated in FIG. 9.

Referring now to the drawings in detail, FIG. 1 illustrates a cultural support for an epiphytic plant, such as a Vanda type of orchid, generally referred to by reference number 10, growing in a monopodial pattern. The plant 10 is one of the small percentage of orchid families of the epiphytic species, which also include orchids in the Cattleya, Phalaenopsis and Dendrobium families. Sympodial growth patterns may also be supported as will be explained hereafter. In each case, the epiphytic plant is characterized by roots 12 that are supported in an exposed position subject to both watering procedures instituted by the grower as well as air currents necessary for a proper balance between moisture saturation and drying. In each case, the plant support arrangement includes a generally conical container denoted by reference numeral 14 in FIG. 1, having a large diameter upper rim 16 and a small diameter bottom 18. For the monopodial growth pattern shown in FIG. 1, a vertical post, generally referred to by reference numeral 20, is provided.

Figure 13:
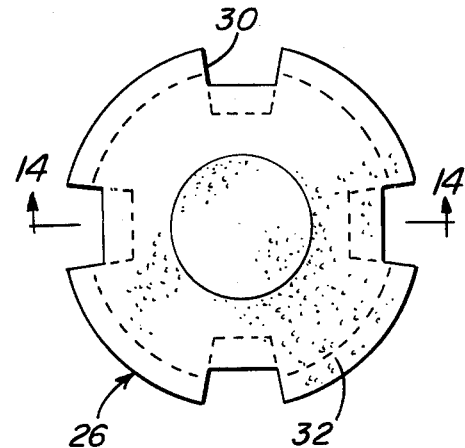
FIG. 13 is a top plan view of the innter core portion of the support body associated with the arrangement shown in FIG. 9.

Referring now to FIGS. 2 and 3 in particular, the container 14 shown is of the type wherein an interior wall surface 22 of conical configuration converges downwardly from the upper rim 16 to the bottom 18. The bottom is provided with an opening 24. Wedgingly positioned within the container and closely spaced below the upper rim 16 is a basic support body generally referred to by reference numeral 26. The support body is made of a water impermeable and decay resistant material such as a closed cell polystyrene. The support body includes a relatively thick peripheral edge 28 presenting a conical surface adapted to abut the interior wall surface 22 of the container. The edge surface 28 will accordingly have the same conical pitch angle as that of the container with respect to its central axis. A plurality of enlarged openings or notches 30 are formed in the edge 28, such as the four equally spaced openings, as more clearly shown in FIG. 13. These openings 30 provide free passage of air currents into the container below the support body in order to accommodate exposure of all surfaces of the support body except for the edge surface 28 in contact with the interior wall surface 22 of the container.

The upper exposed surface 32 of the support body has a convex curvature which may be generally parallel to the concave curvature of the lower exposed surface 34 so as to form an arch configuration. The support body is thereby endowed with the structural strength necessary for support of any contemplated load placed thereon while the support body is wedgingly positioned within the container. The upper surface 32, because of its convex curvature, will promote drainage of water into the openings 30, from which the water may drain out of the container through bottom opening 24. The upper surface 32 will also provide support for the plant roots in a position freely exposed to air currents.

With continued reference to FIGS. 2 and 3, the vertical post 20 extends upwardly from the support body 26 and extends radially inwardly from the peripheral edge 28. As more clearly seen in FIGS. 4 and 5, the support post is generally trapazoidal in transverse cross section having a front edge 36, a pair of side edges 38 diverging therefrom and a curved back edge 40. The post is furthermore made of the same or similar water impermeable and decay resistant material as the support body 26. The bottom end surface 42 of the post as more clearly seen in FIGS. 3 and 6 abuts the upper support surface 32 of the support body so as to vertically position the post. In order to hold the post in this erect position, an appendage 44 projects at an angle from the bottom edge surface 42 and is adapted to be received with a tight fit in one of the openings 30. The appendage 44 also abuts the inner wall surface 22 of the container as shown in FIG. 3. The height of the post is designed to accommodate growth of a plant in the monopodial pattern for a reasonable length of time. The upper end surface 46 of the post is provided with a pair of spaced sockets 48 of non-circular cross section in order to accommodate reception of projections 50 from the bottom of an extension post 52 as more clearly seen in FIGS. 8 and 10.

Figure 12:
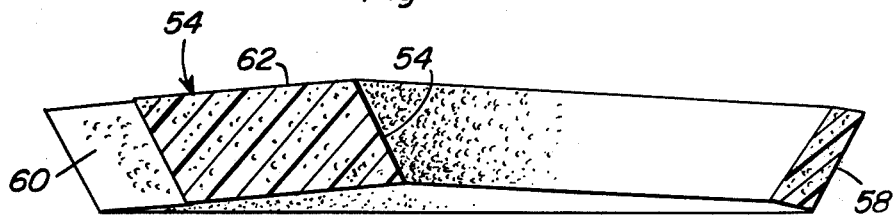
FIG. 12 is a side sectional view taken substantially through a plane indicated by section line 12—12 in FIG. 11.
Figure 14:
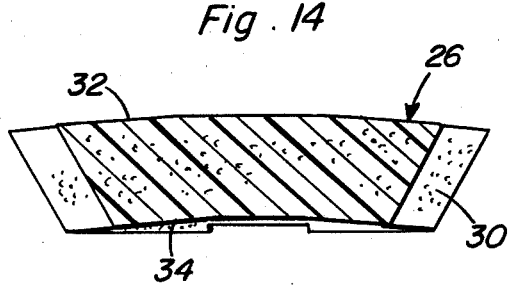
FIG. 14 is a side sectional view taken substantially through a plane indicated by section line 14—14 in FIG. 13.
Figure 7:
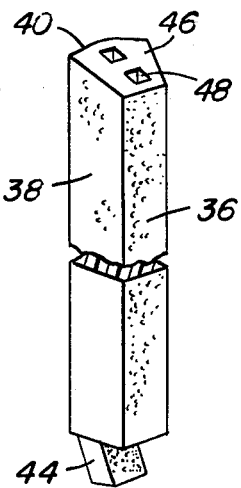
FIG. 7 is a perspective view of the disassembled support post illustrated in FIGS. 4, 5 and 6.

FIG. 9 illustrates an enlarged cultural support arrangement with which a dimensionally larger container 14' is associated. Container 14' is substantially the same as container 14 hereinbefore described except for size and includes an upper rim 16', inner conical wall surface 22' and a bottom 18' provided with an opening 24'. The support body 26 hereinbefore described constitutes the inner core portion of an enlarged support body wherein the inner core is wedgingly received within an eccentric opening 54 formed in an adaptor component 56. The adaptor and inner core thus form an enlarged upper convex support surface and an enlarged lower concave surface that is positioned in spaced relationship below the rim 16' so as to perform the same functions as hereinbefore described with respect to the upper and lower surfaces 32 and 34 associated with the support body 26 itself. As more clearly seen in FIGS. 11 and 12, the adaptor component 56 is provided with a peripheral edge 58 within which the openings 60 are formed, the edge 58 being in wedged abutment with the inner wall surface 22' of the container within which it is positioned. The upper surface 62 of the adaptor forms a continuation of the convex surface 32 of the inner core interrupted by the openings 30. Drainage through the enlarged support body will accordingly be provided by both the openings 30 and 60. The enlarged upper convex surface will, therefore, promote both drainage and air circulation as well as to support the roots of an epiphytic plant. The roots may be anchored to the upper support surface by U-shaped pins 66 as shown in FIG. 9. Anchoring pins 66 may also be utilized to anchor roots to the post 20 as shown in FIG. 1.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a container having a downwardly converging interior wall, a cultural support for epiphytic plants comprising a support body made of a water impermeable material which is not normally subject to decay, said support body including a peripheral edge wedgingly engaged with the container, said peripheral edge having openings formed therein through which air circulation is conducted, said supporting body having external surfaces vertically spaced from each other by said peripheral edge, an upper one of the surfaces having a convex curvature gravitationally inducing drainage of liquid collected thereon through the openings in the peripheral edge, and means for supporting and anchoring roots of epiphytic plants externally on said upper surface to expose the roots to ambient air and moisture.

2. The combination of claim 1 wherein said container includes an upper rim below which the support body is positioned and an open bottom through which air is circulated and liquid drained.

3. The combination of claim 2 including a support post made of the same material as the support body extending vertically from the upper surface presenting extended growth support surfaces to which roots of the plants are anchored.

4. The combination of claim 3 wherein said support post includes an appendage projecting therefrom into one of the openings in the peripheral edge of the support body, said appendage being received in the opening with a tight fit and in abutment with the interior wall surface of the container to hold the support post erect.

5. The combination of claim 4 wherein said support body includes an inner core portion and a radially outer adaptor portion on which the peripheral edge is formed, said inner core portion being wedgingly interfitted within an eccentric opening formed in the adaptor portion.

6. The combination of claim 1 including a support post made of the same material as the support body extending vertically from the upper surface presenting extended growth support surfaces to which roots of the plants are anchored.

7. The combination of claim 6 wherein said support post includes an appendage projecting therefrom into one of the openings in the peripheral edge of the support body, said appendage being received in the opening with a tight fit and in abutment with the interior wall surface of the container to hold the support post erect.

8. In combination with a container having an open bottom and a downwardly converging interior wall surface extending from an upper rim to said open bottom, a solid cultural support body made of a water impermeable material which is not normally subject to decay, said support body including a peripheral edge wedgingly engaged with the interior wall surface of the container below the upper rim, said peripheral edge having openings formed therein through which air circulation is conducted, said supporting body having exposed external surfaces vertically spaced from each other by said peripheral edge, an upper one of the exposed surfaces having a convex curvature gravitationally inducing drainage of liquid collected thereon through the openings in the peripheral edge.

9. The combination of claim 8 wherein said support body includes an inner core portion and a radially outer adaptor portion on which the peripheral edge is formed, said inner core portion being wedgingly interfitted within an eccentric opening formed in the adaptor portion.

10. The combination of claim 8 wherein said water impermeable and decay resistant material is a closed cell polystyrene.

11. The combination of claim 8 including a support post made of the same material as the support body extending vertically from the upper surface presenting extended growth support surfaces.

12. The combination of claim 11 wherein said support post includes an appendage projecting therefrom into one of the openings in the peripheral edge of the support body, said appendage being received in the opening with a tight fit and in abutment with the interior wall surface of the container to hold the support post erect.

* * * * *